June 30, 1936.  W. RICHTER  2,045,801
VOLTAGE INDICATOR
Filed June 19, 1935  2 Sheets-Sheet 1
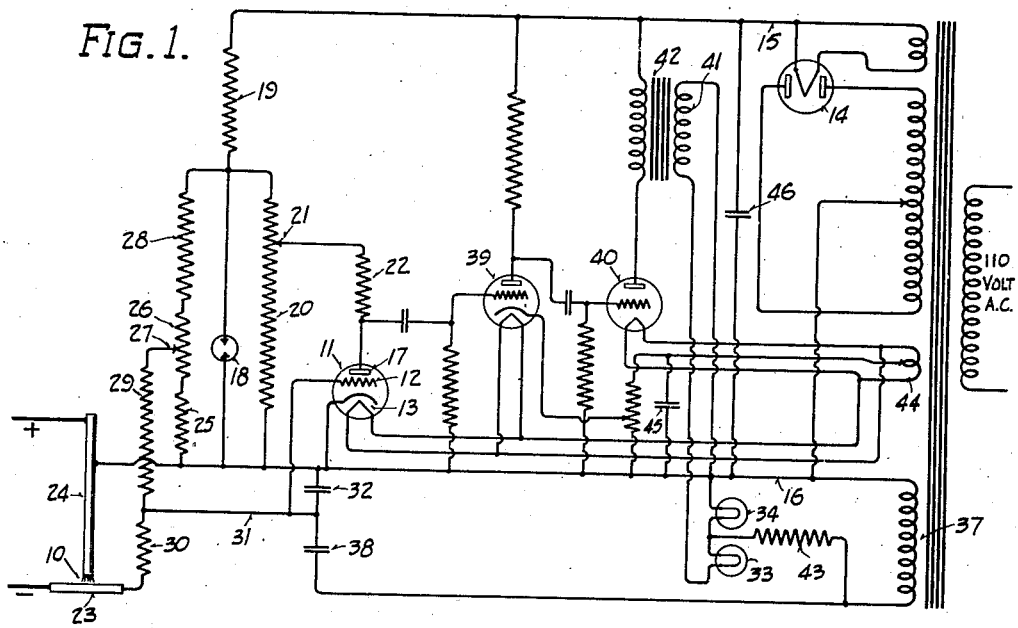
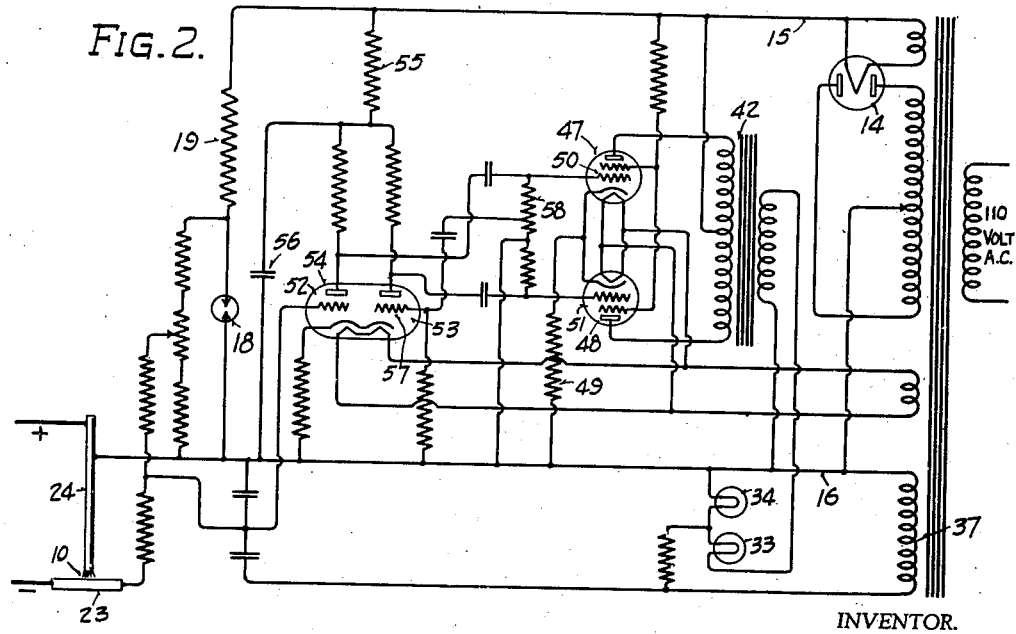
INVENTOR.
Walther Richter
BY
ATTORNEY.

June 30, 1936.　　　W. RICHTER　　　2,045,801
VOLTAGE INDICATOR
Filed June 19, 1935　　　2 Sheets-Sheet 2

INVENTOR.
Walther Richter
BY
ATTORNEY.

Patented June 30, 1936

2,045,801

UNITED STATES PATENT OFFICE 2,045,801

VOLTAGE INDICATOR

Walther Richter, Wauwatosa, Wis., assignor to A. O. Smith Corporation, Milwaukee, Wis., a corporation of New York Application June 19, 1935, Serial No. 27,301

5 Claims. (Cl. 177—311)

The present invention relates to a device for indicating voltages and more specifically to such a device for indicating direct current arc voltages.

The present application is made a continuation in part of applications Serial No. 728,886, entitled Welding arc voltage indicator, filed June 4, 1934, and Serial No. 729,590, entitled Arc length indicator and filed by the present applicant June 8, 1934.

An object of the present invention is the provision of a greatly improved device for amplifying direct current voltages or the changes thereof and more particularly the application of said device in the indication of direct current arc voltages or arc lengths to a welding operator.

A further object is the provision of apparatus particularly adapted for indicating such arc voltages or arc lengths to a welding operator in such a manner that said operator may be fully aware of the voltage condition of his welding arc without the necessity of having his attention diverted from the observation of other important welding conditions.

A further object of the invention is to provide a device embodying certain principles disclosed in the above-mentioned applications, but simplified and improved thereover.

Another object of the present invention is to provide a direct current voltage indicating device in which the indication is produced by means of an electronically amplified superimposed A. C. voltage, such device being so constructed as to be immune to disturbances from any alternating current components of the unidirectional voltages employed for the operation of the electronic amplifying units.

A further object of the invention is to provide the operator, within the range of his conscious vision, high and low indications of voltage or arc length with an intermediate range within the tolerance of which the absence of indication signifies the existence of the predetermined or selected voltage.

It is a further object of the present invention to improve the accuracy of indication of devices of the class described and to more perfectly eliminate disturbance of such indication by changes or variations in conditions extraneous to the voltage being investigated.

Other objects will become apparent by reference to the specification and the attached drawings of which:

Figure 1 is a diagrammatic sketch of an instrument arranged in accordance with the present invention;

Figs. 2 and 3 are modifications of the present invention;

Figure 3:
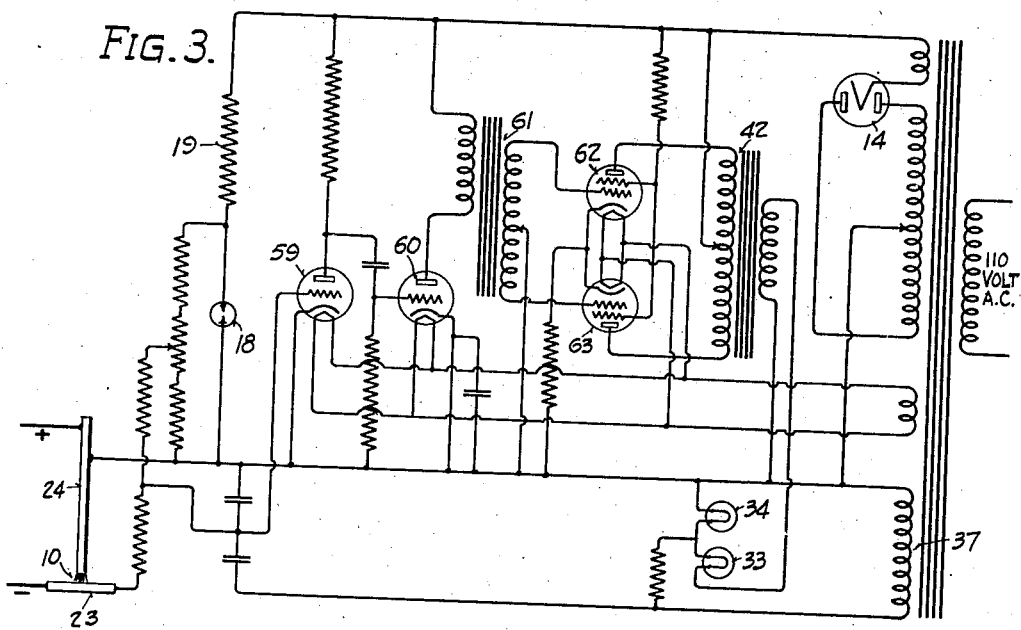

Referring to Figure 1, 10 represents a welding arc or other direct current voltage to be investigated or otherwise utilized in the operation of the device of the present invention. In the earlier application, Serial No. 729,590, a device was disclosed by which indications of the value of a direct current voltage, such as that at 10, were provided through the means of a superimposed alternating current. The said A. C. current was amplified in accordance with the magnitude of the D. C. voltage at 10. There were also means provided to eliminate from such indications the effect of any rapid change or alternation that exists in the voltage under observation. Said amplified A. C. representation of the D. C. voltage is broadly useful not only in indicating the value thereof, but in control devices or other application in which the variations of the D. C. voltage are to be employed. These and other highly advantageous features are retained in the devices of the present invention.

Referring again to Figure 1, electronic tube 11 is made responsive to the direct current voltage changes at arc 10 by connections from said arc to grid 12 and cathode 13. The auxiliary unidirectional voltages needed to operate the electronic units of the device disclosed are obtained from rectifier unit 14 fed from a 110 volt alternating current source. The direct current output voltage of unit 14 is applied across conductors 15 and 16.

To insure a substantially constant potential between the plate 17 of tube 11 and the cathode 13, a neon glow tube 18 in series with resistance 19 is connected across the output terminals 15 and 16 of the rectifier. Instead of a neon tube a voltage regulator tube may be employed. Any variations in the D. C. output voltage of the rectifier are absorbed in resistance 19, the voltage drop through tube 18 being substantially constant. A potentiometer resistance 20 is applied across neon tube 18 to provide an appropriate voltage source for the plate circuit of tube 11. Plate 17 is then connected to potentiometer resistance 20 at a selected suitable point 21 through series resistance 22.

In the device as illustrated in Figure 1, the work 23 to which arc 10 is sprung is negative and the electrode 24 positive. Two voltages are combined in opposite relationship to provide the biasing voltage for application between grid 12 and filament 13. One of these two voltages is the voltage drop across fixed resistance 25 and the lower part of variable resistance 26. This voltage is relatively constant once the adjustable contact 27 is set to the point on resistance 26 which corresponds in the operation of the device to the voltage to be maintained across arc 10. The total voltage drop across resistances 25, 26, and 28 is substantially constant as explained before by reason of neon tube 18.

The other and opposed voltage combining to produce the biasing voltage applied to grid 12 is that of the resistance drop in resistance 29. Resistances 29 and 30 are two high resistances with the conductor 31 leading to grid 12 attached therebetween. These resistances are so related that the resultant voltage drop across 29 will normally exceed that across resistances 25 and 26 to which it is opposed, thereby providing the negative bias applied to grid 12. The adjustment of contact 27 provides the means of setting and calibrating the apparatus for different desired voltages at 10.

Condenser 32 is so selected that, placed as it is in series with high resistance 30 across the arc and in parallel with resistance 29, a suitable time lag factor is produced. Said factor is made effective to substantially eliminate all rapid fluctuations in voltage appearing at the arc from being impressed across grid 12 and cathode 13.

In the device of Figure 1, indications of arc voltage values are conveyed to the welding operator by means of lamps 33 and 34. These lamps are so arranged and associated with the remainder of the device that one lamp is made to be bright when the voltage at the arc is more than that desired or that to which the contact 27 is set, and that the other lamp is made to be bright when the said voltage is lower than that of the setting, the first lamp having been extinguished. When the arc voltage is within the desired range, both lamps are without illumination.

Figure 4:
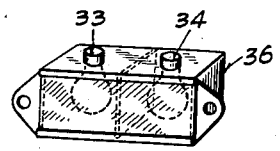
Fig. 4 is a perspective view of a mounting for the comparison lamps of Figs. 1 to 3.
Figure 5:
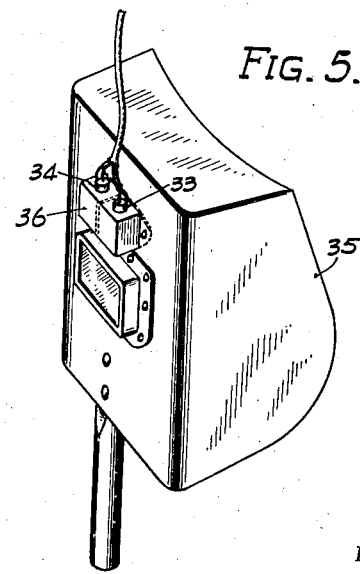
Fig. 5 is a perspective view of a welding operator's shield in which the comparison lamps of Fig. 4 are mounted.

This arrangement of the lamp operation is particularly advantageous to the operator who has the lamps within his range of vision as in the welding hood 35 of Fig. 5. These lamps 33 and 34 are also shown in their mounting case 36 of Fig. 4 which case is mounted on hood 35. Thus the operator needs only to be aware that light exists in one source or the other or not at all to be immediately informed of what correction to make in the handling of his arc. The lamps also dim gradually as the arc reaches its desired condition, further informing the operator of the urgency or lack of urgency of correction for his welding arc.

The results above described as embodied in the indicating lamps of the present device and particularly in Figure 1 are secured as follows:

A small alternating voltage is impressed upon the cathode grid circuit of tube 11 by means of transformer 37 through condenser 32. Condenser 38 is inserted to act as a voltage divider and give the desired A. C. voltage across condenser 32 which condenser has been previously selected to assist in damping out the fluctuations of arc voltage as applied to this same grid circuit.

As explained in the earlier application, the direct current bias of this tube effectively controls the degree of amplification of the A. C. voltage impressed thereon. These A. C. components are successively amplified first in tube 39 and then in power tube 40, the couplings from tube to tube being such that only the alternating components are amplified. The resultant amplified alternating current component appears on the alternating current component appears on the secondary side 41 of transformer 42 where it is impressed upon the lamps 33 and 34 in series.

When no A. C. amplification takes place there is no current supplied through secondary 41. This is in the present case the condition of an arc voltage above the desired voltage. At this time, lamp 34 is made bright by a relatively fixed current received from transformer 37 through resistance 43. Lamp 33 is prevented from receiving such current by the inductance and equivalent resistance of transformer 42 in combination with tube 40.

As the arc voltage drops, amplified A. C. currents appear at 41 and flow through lamps 33 and 34 in opposite phase to the current first flowing in lamp 34. A lowering of the arc voltage dims the light of lamp 34 by the resulting diminution of the current flowing therethrough and becomes non-luminous within the desired range of voltage.

The current is correspondingly increasing in lamp 33 and this lamp becomes incandescent as the voltage decreases below the calibrated setting selected at resistance 26 by contact 27.

The cathode of power tube 40 and the heaters of tubes 11 and 39 are supplied by heater transformer 44. Fluctuations in cathode voltage due to said A. C. connections are prevented by the employment of an efficient filter condenser 45. The direct current supplied by rectifier 14 is also made steady by the employment of an effective filter condenser 46.

In Fig. 2, certain modifications are made in the mode of reaching the signal combination just described. As before, lamps 33 and 34 are caused to respond to voltage changes. However, transformer 42 is in this case center tapped on its primary with said tap connected to one secondary terminal 15 of rectifier 14, the extremities of said primary winding of the transformer being connected respectively to the plates of two push-pull power tubes 47 and 48 arranged to supply said transformer, and the cathodes of tubes 47 and 48 being connected to the other side 16 of the rectifier through plate current control resistance 49.

By the above arrangement of the power tubes, all necessity for filtering out of A. C. components from the D. C. of rectifier 14 at these tubes is removed since any such component would flow into transformer 42 at the center tap and neutralize itself by flowing in equal and opposite paths therethrough. It will be noted all such filtering has been eliminated.

In Fig. 2, the push-pull tubes 47 and 48 are controlled by grids 50 and 51 subjected to alternating voltage values obtained from sections 52 and 53 of duplex tube 54. The plate currents for tube 54 are obtained through resistance 55 and the supply voltage is filtered of A. C. components by means of a filter condenser 56. This filter condenser is a very small inexpensive condenser compared to those required in Figure 1 for filtering the output of the rectifier. Tube section 52 receives and amplifies the impressed A. C. voltage in a manner similar to the tube 11 of Fig. 1. Grid 57 of tube section 53 receives its voltage from coupling resistance 58 which ties it to grid 50. The output of tube section 53 is then coupled to the grid 51 of the push-pull tube 48, which in turn controls the output of the tube 48. The connection of grid 57 to resistance 58 is so adjusted as to produce equal magnitudes of A. C. output in each of the push-pull circuits. These outputs are seen to be 180° apart in phase and, since they are connected as shown to transformer 42, they combine to supply alternating current in unison to this transformer and produce in the secondary thereof the current employed to control the illumination of the indicating lamps 33 and 34.

The tubes 47 and 48 are in effect two power tubes which both feed the signal lamp circuit, but are so used that any alternating current effects other than the one originally supplied by the output of tube section 52 are neutralized. Filtering of the unidirectional voltage supplied to the power tubes by the rectifier is made unnecessary.

In Fig. 3, the arrangement of Fig. 2 is modified by employing tubes 59 and 60 to amplify the impressed alternating current values. The plate current alternating value of tube 60 is then applied to transformer 61 of which the secondary is center tapped with said tap connected to one polarity, the two ends of said secondary being employed to produce the grid voltages of the two push-pull power tubes 62 and 63. Thus these latter tubes, as in Fig. 2, feed transformer 42 with an alternating current which is an indication of the voltage in arc 10.

The devices of the present invention may be used to indicate other characteristics of a welding arc as for instance the current values in said arc by passing such currents through a shunt and applying the resulting voltage across such shunt to the tube circuits to control the amplification of the A. C. imposed upon such tube. These devices may also be used to indicate other voltages and be used in various electrical devices. It will be clear also that the currents produced by the devices for indicating certain electrical values could also be employed to regulate or control such values as well as to operate indicating means.

I claim:

1. A device for indicating to an arc welding operator the voltage of his welding arc comprising a pair of light sources mounted within the range of vision of said operator, and means responsive to the arc voltage to cause one of said lights to increase in illumination from none as the arc voltage increases above a given selected voltage range and the other light to increase in illumination from none as the arc voltage decreases below said selected voltage range.

2. A device arranged to indicate electrical voltages comprising means to indicate when such voltage value is above a given predetermined range of values, and other means to indicate when said voltage is below said range, said two above mentioned means including means to produce the indications in both of said indicating means with increasing intensity of indication in each indicator respectively as the said voltage deviates further from said predetermined range toward the high and low values.

3. An indicator for a voltage characteristic of a unidirectional electric current comprising an electronic tube of at least three electrodes, a source of alternating voltage of predetermined value, means connecting said alternating voltage and said unidirectional electric current circuit to said tube to produce an alternating voltage varying in value in accordance with the variations in said characteristic of the unidirectional current, and means to apply an amplified value of said varying alternating voltage to a pair of indicating lights and to apply to one of said lights an additional voltage of a phase substantially opposed to said last named varying alternating voltage to cause one lamp to be bright when the unidirectional current characteristic is above a selected value and the other light to be bright when said characteristic is below said selected value.

4. In a device responsive to the voltage of a unidirectional electric current, the combination comprising a thermionic tube of at least three electrodes, means for impressing across two of such electrodes an alternating voltage of predetermined voltage to produce amplified alternating values of said alternating voltage, means to vary the amplitudes of said alternating values in accordance with variations in the said unidirectional voltage, amplifying means including an electronic push-pull amplifier responsive to said amplified alternating values to amplify the said amplified alternating values independent of voltage fluctuations in auxiliary power supply apparatus employed in such amplification, and means including a pair of indicators responsive to said amplified alternating values to variably indicate respectively when said unidirectonal voltage is above or below a predetermined range.

5. In apparatus of the character described, a first source of voltage, means to vary said voltage in accordance with a characteristic to be indicated, two voltage responsive devices, means connecting said devices in series with each other and with said first source, a second source of voltage of predetermined value, means connecting said second source across the terminals of one of said devices to oppose the voltage applied to said device by said first source, whereby said last mentioned device will be operated by the voltage from said second source when the voltage from said first source falls below a predetermined value and said other device will be operated by the voltage from said first source when the latter rises above a predetermined value.

WALTHER RICHTER.